United States Patent
Acuna (10) Patent No.: US 9,103,983 B2
(45) Date of Patent: Aug. 11, 2015

(54) OPTICAL ELEMENT WITH MECHANICAL ALIGNMENT AND METHOD OF MAKING SAME

(75) Inventor: Robert B. Acuna, Avondale, AZ (US)

(73) Assignee: POLYMICRO TECHNOLOGIES, Phoenix, AZ (US)

( * ) Notice: Subject to any disclaimer, the term of this patent is extended or adjusted under 35 U.S.C. 154(b) by 951 days.

(21) Appl. No.: 13/052,910

(22) Filed: Mar. 21, 2011

(65) Prior Publication Data
US 2011/0235973 A1    Sep. 29, 2011

Related U.S. Application Data

(60) Provisional application No. 61/315,662, filed on Mar. 19, 2010.

(51) Int. Cl.
| G02B 6/32 | (2006.01) |
| G02B 6/255 | (2006.01) |
| G02B 6/26 | (2006.01) |
| G02B 6/38 | (2006.01) |

(52) U.S. Cl.
CPC .............. *G02B 6/2552* (2013.01); *G02B 6/262* (2013.01); *G02B 6/3853* (2013.01); *G02B 6/3855* (2013.01)

(58) Field of Classification Search
None
See application file for complete search history.

(56) References Cited

U.S. PATENT DOCUMENTS

| 6,282,349 | B1 | 8/2001 | Griffin | |
| 7,400,799 | B2 * | 7/2008 | Koishi | 385/33 |
| 7,507,038 | B2 * | 3/2009 | Nakamura et al. | 385/96 |
| 2002/0110332 | A1 | 8/2002 | Clarkin et al. | |
| 2005/0002626 | A1 | 1/2005 | Watanabe et al. | |
| 2006/0188213 | A1 | 8/2006 | Griffin | |
| 2007/0122084 | A1 | 5/2007 | Stephen | |
| 2007/0172174 | A1 | 7/2007 | Scerbak et al. | |
| 2008/0247714 | A1 * | 10/2008 | Nakamura et al. | 385/96 |

FOREIGN PATENT DOCUMENTS

| GB | 2 191 873 | 12/1987 |
| JP | 59-010918 | 1/1984 |
| JP | 2004-347991 | 12/2004 |
| WO | WO 01/71403 | 9/2001 |
| WO | WO 03/010562 | 2/2003 |

OTHER PUBLICATIONS

International Search Report dated Aug. 1, 2011 for PCT/US2011/029224.
Japanese Office Action dated Oct. 21, 2014 for 2013-501355.

* cited by examiner

*Primary Examiner* — Michelle R. Connelly
*Assistant Examiner* — John M Bedtelyon
(74) *Attorney, Agent, or Firm* — Pillsbury Winthrop Shaw Pittman, LLP (57) ABSTRACT

A product and process for fabricating an optical element from a capillary ferrule includes fusing the optical element onto an optical fiber. The optical element starts with a capillary ferrule that is sculpted on one end to form an optical property such as a flat window, ball lens, angled endface or other sculpted shape. The ferrule is fused onto an optical fiber that has been inserted into the ID of the capillary ferrule. As a result, the ferrule serves as a mechanical aligner for the optical element to fiber fusion process.

9 Claims, 11 Drawing Sheets

OPTICAL ELEMENT WITH MECHANICAL ALIGNMENT AND METHOD OF MAKING SAME

This application claims priority to U.S. Provisional Patent Application 61/315,662, filed Mar. 19, 2010, herein incorporated by reference in its entirety.

BACKGROUND

1. Field

The present invention relates generally to coupling of optical elements, and more particularly to alignment and coupling of an optical element with an optical fiber end.

2. Background

Various applications are known that involve the fusion of a silica disk or rod onto the end of an optical fiber. In general, devices of this type are made using a fusion splicing technique that relies on heating using a laser or arc source. In this approach, the silica disk and the optical fiber are heated simultaneously to create a fused region and generally the silica disk is of similar diameter to the optical fiber, or larger. In addition, such a method would involve fusing of an optically flat silica disk or a solid cylinder, with no other optical or mechanical features.

SUMMARY

An aspect of an embodiment of the present invention includes an optical element fused with an optical fiber in mechanical alignment.

An aspect of an embodiment of the present invention includes a method of manufacturing an optical element fused with an optical fiber in mechanical alignment.

DESCRIPTION OF THE DRAWINGS

Other features described herein will be more readily apparent to those skilled in the art when reading the following detailed description in connection with the accompanying drawings, wherein.

DETAILED DESCRIPTION

In an embodiment of the present invention, an optical fiber is fused to a silica ferrule or tube of varying inner diameter (ID) and outer diameter (OD). The ferrule ID is sized to match the optical fiber OD or an intermediate spacing silica sleeve with an ID that is sized to match the OD of the fiber. The ferrule OD is typically significantly larger than the optical fiber OD. The fusion is performed by heating the ferrule (typically by a laser such as a $CO_2$ laser, but including, for example, a fusion splicer, an electric arc resistance element, and/or a plasma) and then inserting the fiber into the hole of the ferrule. This minimizes the heating of the optical fiber which reduces damage to the optical fiber coatings and fiber doping profile. Furthermore, the ferrule can be configured with other mechanical or optical features which become useful in the finished device. Such features can be optical in nature, such as an incorporated lens or angled face, or mechanical, such as a flat or slot, which can be used as an alignment key in the finished device. In the case where the ferrule OD is significantly larger than the optical fiber OD, the finished device will generally provide greater ease of handling as compared to other approaches. In an embodiment, use of a ferrule having a relatively large OD may simply eliminate the step of separately mounting a silica disk into a ferrule. The larger OD ferrule can also be set at an industry standard OD thereby becoming the finished device ferrule with no further processing. The ID of the ferrule also serves as an "auto-aligning" feature which holds the fiber in the proper position with respect to the ferrule, with or without the intermediate spacing sleeve, and the ferrule's optical and mechanical features. In this regard, the ID may be varied from a diameter slightly larger than the fiber OD down to a diameter equal to or slightly less than the fiber OD thereby precisely locating the fiber end with respect to the ferrule end, both distance and angle, and with respect to the ferrule center.

As will be understood, the fiber to be fused may be a single mode, multimode, step index, graded index, photonic bandgap, rare earth doped, active, polarization maintaining and/or high birefringent fiber.

In an embodiment, the ferrule is made from a material having a refractive index equal to or substantially similar to the refractive index of the optical fiber to which it is to be fused. In this regard, materials of primary interest are synthetic fused silica and quartz glass. In addition to providing good refractive index matching to optical fiber, these materials generally match the thermal expansion properties of optical fiber as well. The optical element can consist of varying geometries that are shaped either by common or proprietary laser machining techniques or mechanical polishing techniques or a combination of both. It is expected that the optical element can be used with or without optical coatings, such as an anti-reflective coating for specific applications using narrow wavelength bandwidths.

In various end-use applications, the presence of the optical element tends to reduce power density on the optical fiber end face thus reducing laser induced damage. This reduction relative to a damage threshold may allow the usage of higher laser powers launched directly from the laser source into the optical element to be fused onto the optical fiber. The optical element can also function as an optical lens such as those currently sculpted onto optical fibers. In a particular embodiment the optical element may be of the disk type, for example a 2 mm disk type optical element. In an alternate particular embodiment, the element may be a 300 µm semi-spherical element. In an alternate particular embodiment, the element may be a 500 µm spherical element.

Figure 1A:
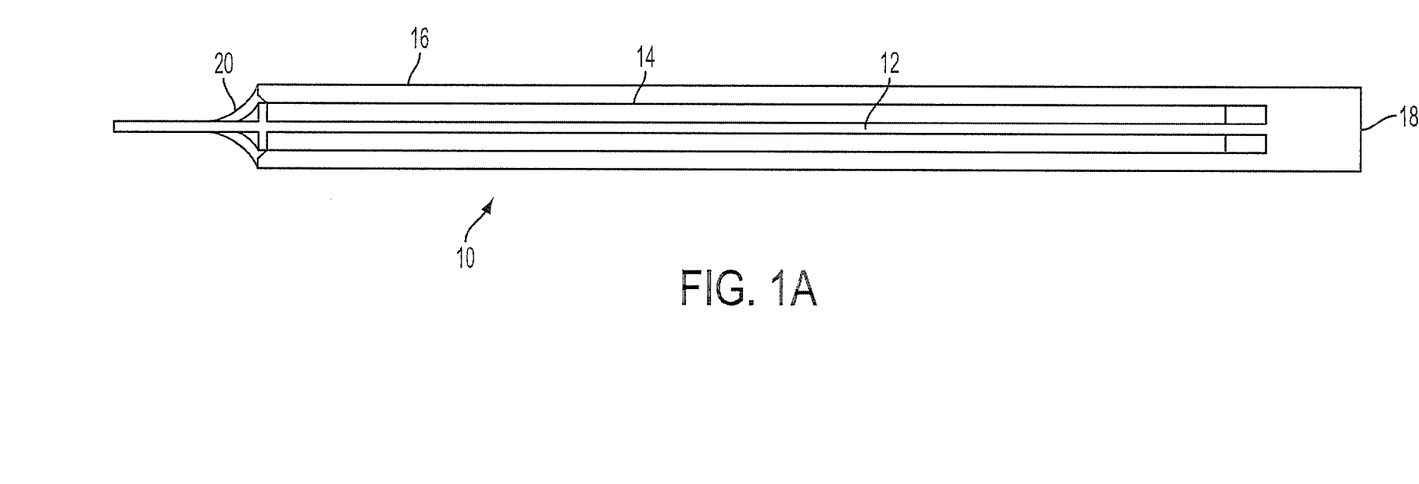
FIGS. 1A and 1B are illustrations of a fiber fused with a disk-shaped optical element in accordance with an embodiment of the present invention.

FIG. 1A illustrates an example of an optical element 10 in accordance with an embodiment of the invention. An optical fiber 12 is held within an intermediate spacing sleeve 14 and within a ferrule 16. A flat end optical element 18 is formed at the distal end of the optical element 10. An adhesive 20 is optionally used to seal the proximal end of the element. FIG.

Figure 1B:
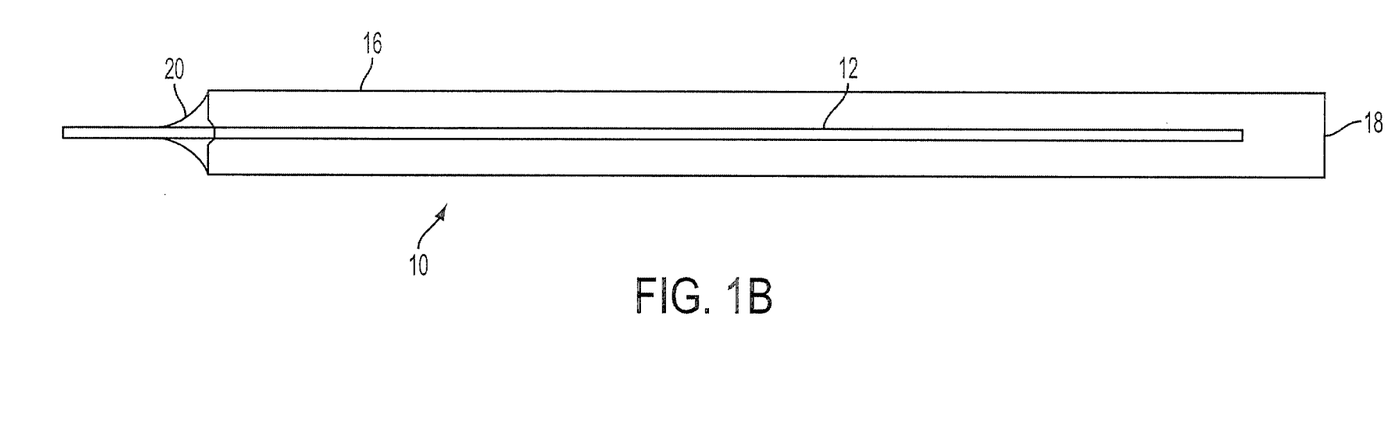

1B illustrates a similar optical element 10, lacking only the intermediate spacing sleeve 14.

Figure 2A:
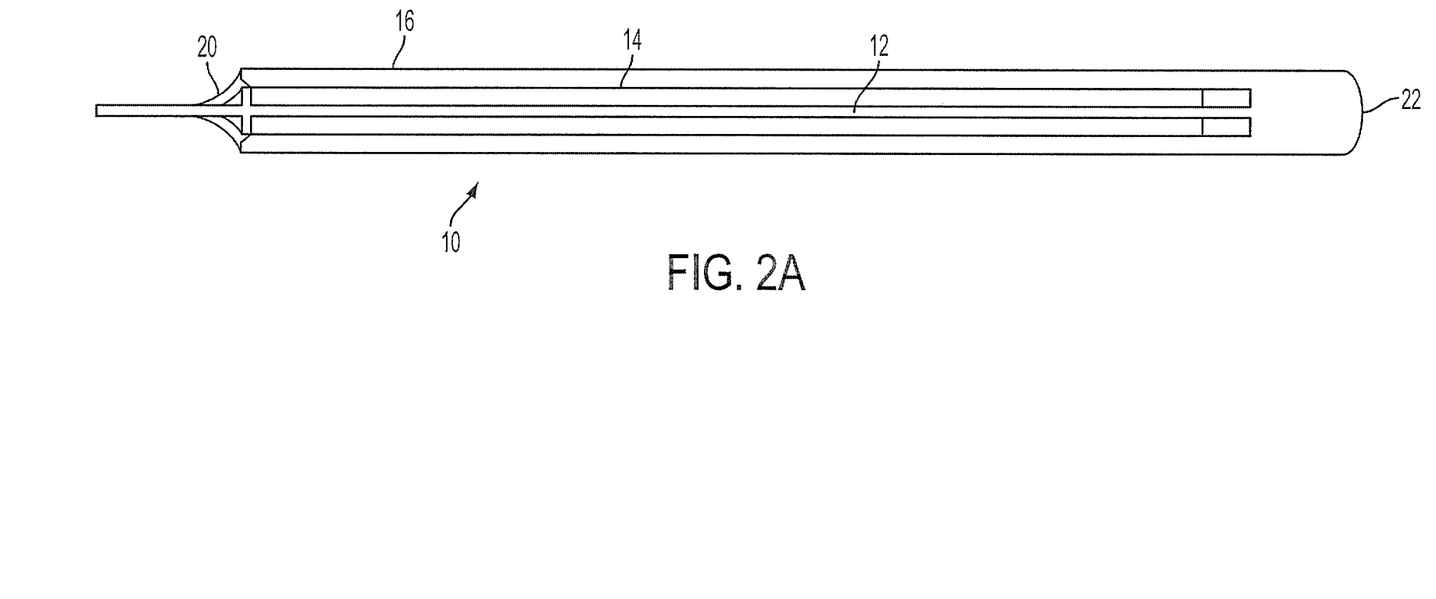
FIGS. 2A and 2B are illustrations of a fiber fused with a convex optical element in accordance with an embodiment of the present invention.
Figure 2B:
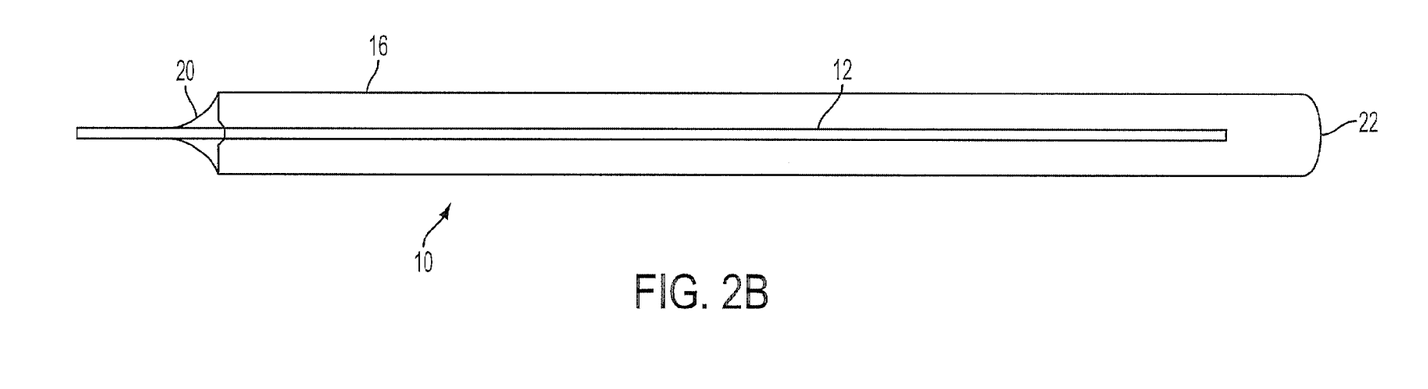

FIG. 2A illustrates an example of an optical element 10 similar to the optical element of FIG. 1A, but having a convex optical element 22 formed at the distal end. The optical element of FIG. 2B is similar to the optical element of FIG. 2A, but lacks the intermediate spacing sleeve 14.

Figure 3A:
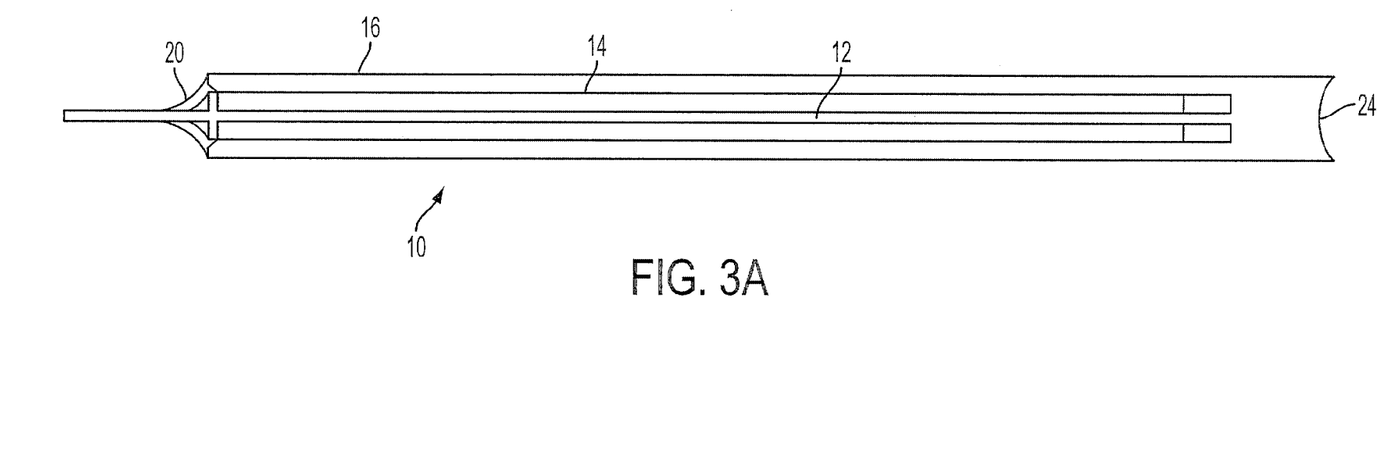
FIGS. 3A and 3B are illustrations of a fiber fused with a concave optical element in accordance with an embodiment of the present invention.
Figure 3B:
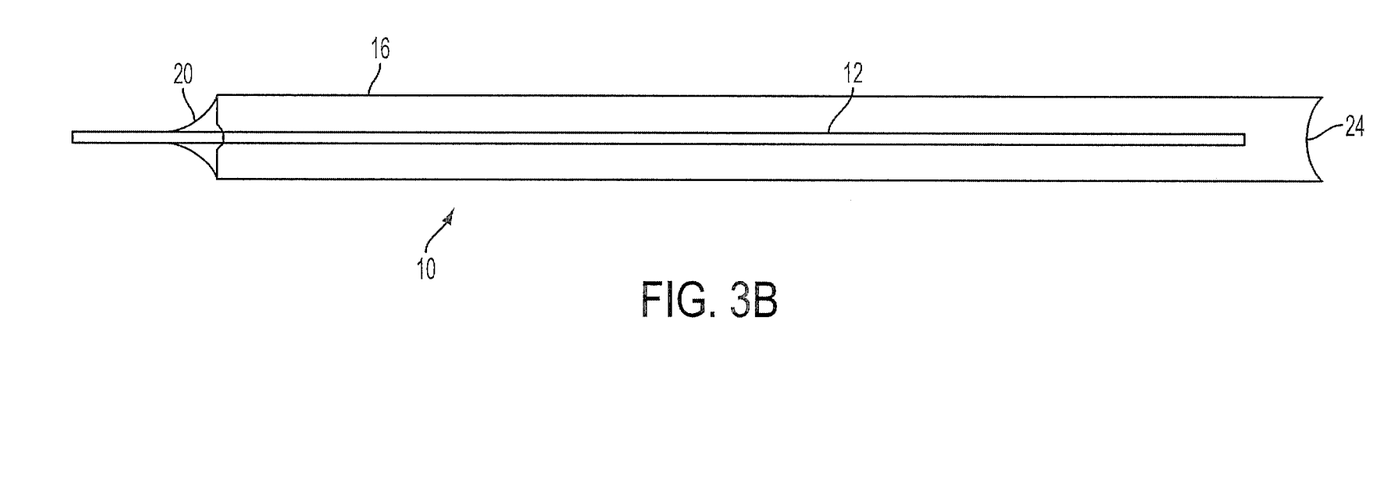

FIG. 3A illustrates an example of an optical element 10 similar to the optical element of FIG. 1A, but having a concave optical element 24 formed at the distal end. The optical element of FIG. 3B is similar to the optical element of FIG. 3A, but lacks the intermediate spacing sleeve 14.

Figure 4A:
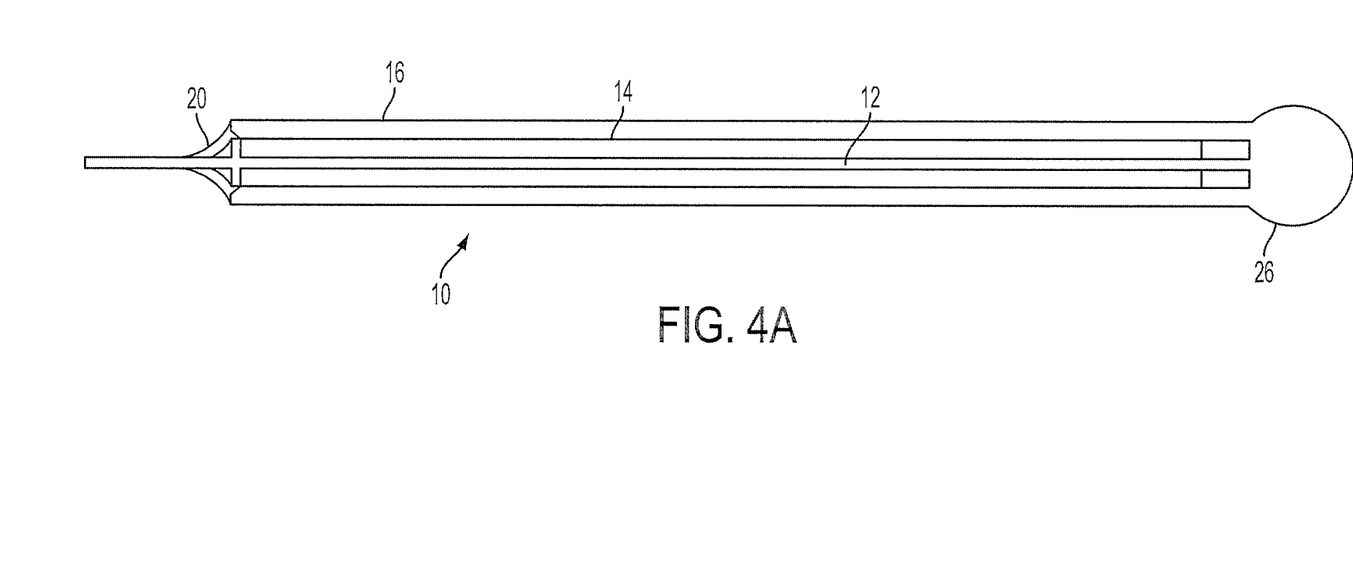
FIGS. 4A and 4B are illustrations of a fiber fused with a spherical optical element in accordance with an embodiment of the present invention.
Figure 4B:
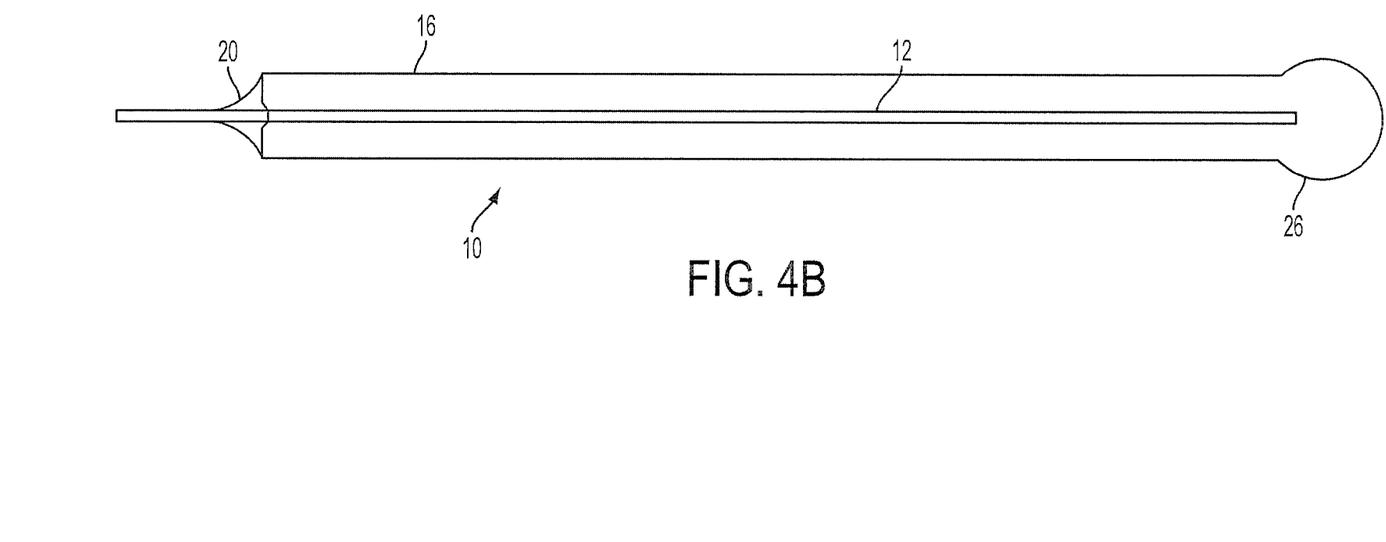

FIG. 4A illustrates an example of an optical element 10 similar to the optical element of FIG. 1A, but having a spherical optical element 26 formed at the distal end. The optical element of FIG. 4B is similar to the optical element of FIG. 4A, but lacks the intermediate spacing sleeve 14.

Figure 5A:
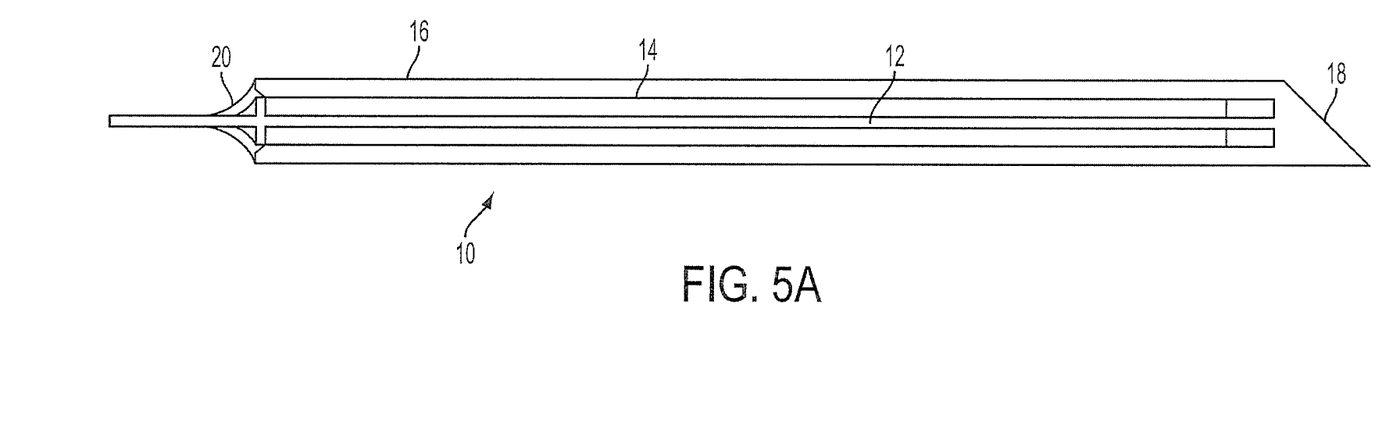
FIGS. 5A and 5B are illustrations of a fiber fused with a side firing optical element in accordance with an embodiment of the present invention.
Figure 5B:
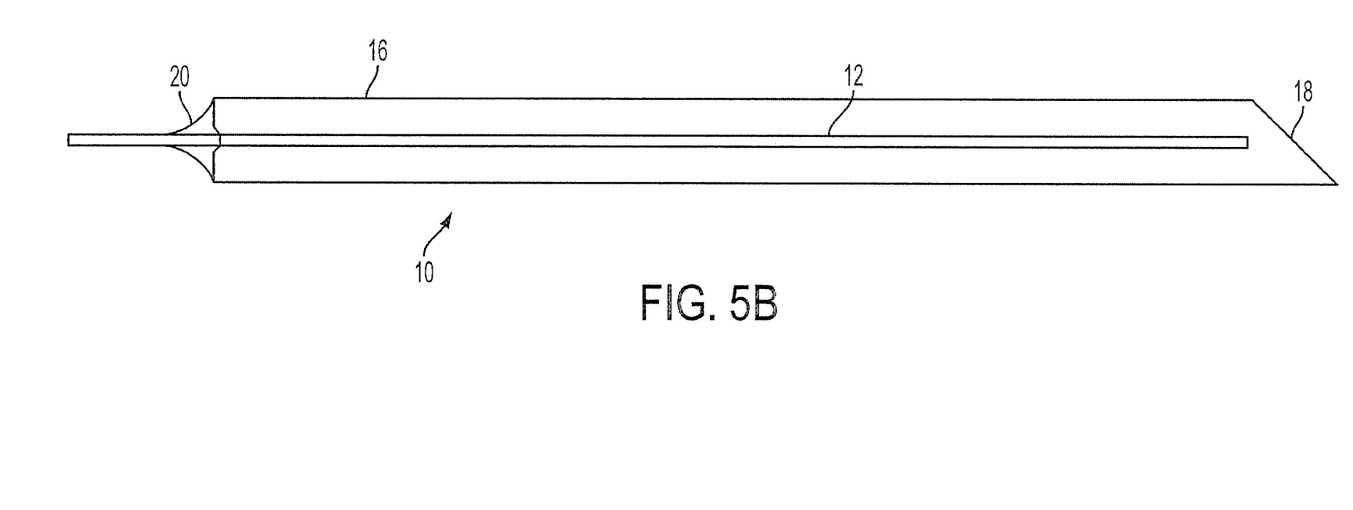

FIG. 5A illustrates an example of an optical element 10 similar to the optical element of FIG. 1A, but having a side firing optical element 28 formed at the distal end. The optical element of FIG. 5B is similar to the optical element of FIG. 5A, but lacks the intermediate spacing sleeve 14.

In an embodiment, the optical element is made from capillary tubing, also known as a ferrule, consisting of a tube having one or more inside diameters. The mechanical alignment of the optical element is also provided by the same ferrule. By way of example, a ferrule for use in an embodiment of the invention may have an outside diameter (OD) from 200 um to more than 3500 um and the inside diameter (ID) may typically be from 50 um to more than 2500 um so long as the wall thickness between the ID and OD is sufficient for forming a mass that will become the optical element. The overall length of the ferrule can typically be as short as 3 mm and as long as 100 mm. The length or thickness of the optical element formed from the ferrule can typically be as thin as 5 um and as thick as 10 mm.

The process of forming the optical element uses a methodology which allows for varying geometries and may provide the ability to achieve high production volumes, as illustrated in FIGS. 6A-6E. A ferrule 40 is cleaved to a desired length, commonly up to a few centimeters, and then positioned into a laser machining station. An optical fiber 42 or a group of optical fibers, which may be, for example, single mode or multimode fiber, prepared for fusing, are inserted into the ferrule and fixed at a predetermined location with respect to the estimated optical element location.

Figures 6A, 6B:
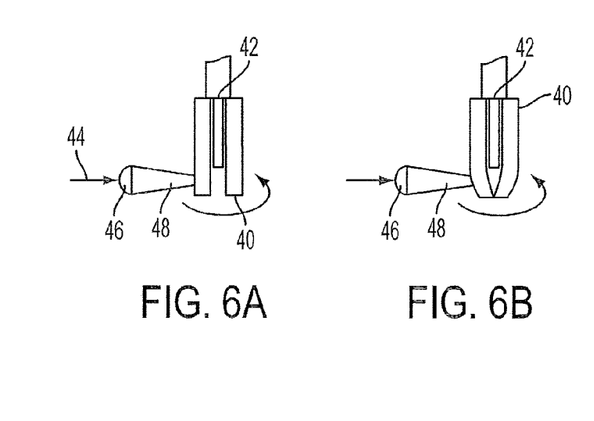
FIGS. 6A-6E are illustrations of steps in a method of fusing an optical fiber with a ferrule to form a spherical optical element.
Figure 6C:
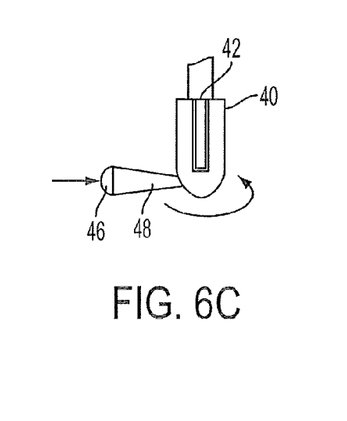
Figure 6D:
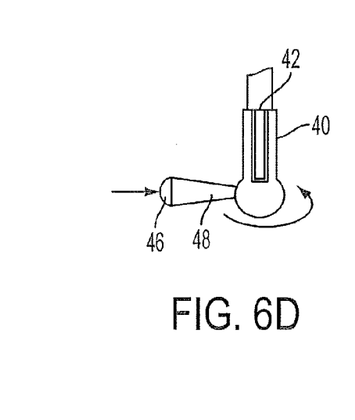
Figure 6E:
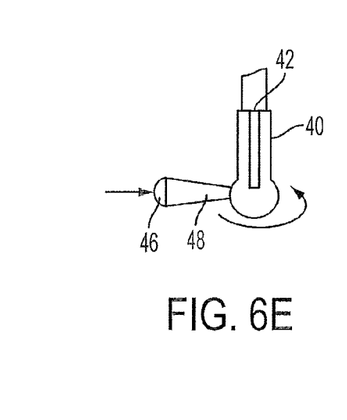

To form the optical element from the capillary tubing (ferrule) a sufficient amount of mass must be manipulated to form the desired shape. This mass from the ferrule is heated to achieve a molten state via laser energy typically by a $CO_2$ laser 44 operating at a wavelength of 10.6 um in continuous wave mode; however other types of lasers such as Nd:YAG operating at a wavelength of 1064 nm, or a $CO_2$ laser operating at a wavelength of 9.6 um, among others may also be used. In the illustrated embodiment, a focusing lens 46 may be used to focus the laser beam 48 onto a target region as necessary or desirable. In an embodiment, the focus spot size may be a few hundred microns, for example, 350-450 μm, or more particularly, about 380 μm. As shown in FIG. 6B, the ferrule 40 collapses as it is heated. FIG. 6C illustrates the condition when the ferrule 40 has completely collapsed, and FIG. 6D illustrates the mass at the end as it is formed into a spherical optical element. In an embodiment, the fiber and ferrule may still not have been fused together. In this approach, the fiber/ferrule assembly is then repositioned with respect to the focused beam as illustrated in FIG. 6E. Once so positioned, the fusion step may proceed.

In order to provide uniform heating, controlled laser heating may be performed while rotating (arrow) the fiber relative to the laser (or alternately, by rotating the laser beam around the fiber). As will be appreciated, the laser manipulation of the mass may produce, for example, semispherical, spherical or flat geometries. Likewise, a selected radius of curvature may be achieved in accordance with the desired final application. As described above, other heat sources aside from lasers may alternately be employed in this and other embodiments.

Once the optical element is formed from molten material of the ferrule, the fusion of the optical element to the optical fiber(s) is performed while the ferrule mass is in the molten state. Radiant energy from the molten mass will have heated the end face of the optical fiber(s) that is to be fused to the optical element. The optical fiber(s) and the molten mass should be close together to allow for heat transfer and fusion success, for example a distance on the order of a few microns up to about 20 μm. By further heating, the molten mass is grown until contact of the mass to the optical fiber(s) is made and fusion between the optical element and the fiber is accomplished. Likewise, laser machining techniques may be used to collapse the ferrule's ID onto the optical fiber to fuse the two together along the length of the ferrule. This collapse may, in principle, be partially or completely performed prior to the formation of the optical element.

While the molten ferrule mass remains soft, and with the fusion completed, the ferrule mass can be formed into a desired geometry using varying techniques such as stamp-mold forming, or other techniques commonly used to sculpt optical fiber. Alternately, or in addition, once the optical element has been cooled to room temperature it may be reformed to a desired geometry via mechanical polishing or further laser machining.

In a process in accordance with an embodiment of the invention, a first step involves cleaving a capillary tubing (ferrule) to a predetermined length. Next, the ferrule is positioned into a laser machining station. Next, the optical fiber or fibers to be fused are inserted into the ferrule. Next, the optical element mass is formed using a heating process. Once the optical element mass is formed, the optical fiber or fibers are fused to the mass. Finally, the optical element mass is sculpted to produce a final geometry using mechanical and/or laser machining.

In an embodiment, the ferrule has a large ID compared with the fiber OD. In general, such an arrangement may allow for an improved optical index mismatch at the air interface, meaning that an increased amount of the machining laser light would be delivered to the ferrule without heating the fiber. In this case, an intermediate sleeve may be positioned between the ferrule and the fiber in order to physically position the fiber.

In an embodiment, the optical element is manufactured to produce a side-fire configuration. For example, it may be machined to have an angled end-face such that light exiting the fiber is transmitted at an angle to its length.

In an embodiment, the ferrule is doped such that a portion of the ferrule to be fused has a relatively lower softening temperature compared with the bulk of the ferrule. Ferrules having this structure are described in U.S. Pat. No. 6,883,975, herein incorporated by reference in its entirety.

In an embodiment, the ferrule may be doped such that it contributes optical properties to the finished optical element. For example, the ferrule may be doped such that in the finished product, it acts as a portion of the waveguide design for the finished element. In an example, the ferrule is doped with fluorine such that it acts as a cladding or outer waveguide to contain light in the fiber/optical element system.

In an embodiment, the ferrule includes a flattened or notched internal portion that is configured to cooperate with a complementary flattened or protruding (or vice versa) external portion of the fiber to be inserted and aligned.

Those skilled in the art will appreciate that the disclosed embodiments described herein are by way of example only, and that numerous variations will exist. For example, as will be appreciated by one of ordinary skill in the art, the dimensions described herein are by way of example, but are not limits as to sizes that may be used. The invention is limited only by the claims, which encompass the embodiments described herein as well as variants apparent to those skilled in the art.

The invention claimed is:

1. A method of manufacturing an optical element comprising:
    positioning a capillary tube having a selected length in a machining station;
    inserting an optical fiber into an opening of the capillary tube, leaving at least a distal portion of the capillary tube empty;
    heating the distal portion of the capillary tube to collapse the empty distal portion of the capillary tube and form an optical element mass formed from molten material of the collapsed distal portion of the capillary tube;
    fusing the optical element mass directly to an end face of the optical fiber; and
    machining the optical element mass to produce an optical element having a selected final geometry.

2. A method as in claim 1, wherein after the heating, the capillary is moved into contacting relation with the end of the optical fiber to facilitate the fusing.

3. A method as in claim 1, wherein the heating further comprises applying laser energy to the capillary tube without applying the laser energy to the optical fiber.

4. A method as in claim 1, wherein the method is performed without the use of any alignment devices or external fixturing for the purpose of fiber centering relative to the capillary tube.

5. A method as in claim 1, wherein an internal portion of the capillary tube comprises a layer of material preferentially softenable relative to the remainder of the capillary tube.

6. A method as in claim 5, wherein the preferentially softenable layer comprises a material having a lower softening temperature than the remainder of the capillary tube.

7. A method as in claim 1, wherein at least a portion of the capillary tube is doped such that the doped portion of the capillary tube acts as an optical waveguide.

8. A method as in claim 1, wherein the capillary tube comprises a portion configured to cooperate with a complementary portion of the optical fiber to jointly act to align the capillary tube to the optical fiber.

9. A method as in claim 1, wherein the inserting comprises positioning a face of the optical fiber at a position less distal than an end of the capillary tube to define the empty distal portion of the capillary tube.

* * * * *